(12) United States Patent
Wang et al.

(10) Patent No.: US 12,462,380 B2
(45) Date of Patent: Nov. 4, 2025

(54) METHOD AND SYSTEM FOR SIMULTANEOUS CLASSIFICATION AND REGRESSION OF CLINICAL DATA

(71) Applicant: SHENZHEN KEYA MEDICAL TECHNOLOGY CORPORATION, Shenzhen (CN)

(72) Inventors: Xin Wang, Seattle, WA (US); Youbing Yin, Kenmore, WA (US); Bin Kong, Charlotte, NC (US); Yi Lu, Seattle, WA (US); Xinyu Guo, Redmond, WA (US); Hao-Yu Yang, Seattle, WA (US); Qi Song, Seattle, WA (US)

(73) Assignee: SHENZHEN KEYA MEDICAL TECHNOLOGY, Shenzhen (CN)

( * ) Notice: Subject to any disclaimer, the term of this patent is extended or adjusted under 35 U.S.C. 154(b) by 754 days.

(21) Appl. No.: 17/725,051

(22) Filed: Apr. 20, 2022

(65) Prior Publication Data

US 2022/0351374 A1 Nov. 3, 2022

Related U.S. Application Data

(60) Provisional application No. 63/178,923, filed on Apr. 23, 2021.

(51) Int. Cl.
*G06T 7/00* (2017.01)
*G06V 10/40* (2022.01)
*G06V 10/764* (2022.01)
*G06V 10/776* (2022.01)
*G06V 10/82* (2022.01)
(Continued)

(52) U.S. Cl.
CPC ............ *G06T 7/0012* (2013.01); *G06V 10/40* (2022.01); *G06V 10/764* (2022.01); *G06V 10/776* (2022.01); *G06V 10/82* (2022.01); *G16H 50/20* (2018.01); *G16H 50/30* (2018.01); *A61B 6/504* (2013.01); *G06T 2207/20081* (2013.01); *G06T 2207/20084* (2013.01); *G06T 2207/30101* (2013.01); *G06V 2201/03* (2022.01)

(58) Field of Classification Search
CPC ........ G16H 50/20; G16H 30/40; G16H 50/70; G16H 50/30; G16H 30/20; G16H 50/50; G16H 10/60; G16H 20/10; G16H 20/40; G16H 10/40; G16H 15/00; G16H 70/60; G16H 10/20; G16H 40/67; G16H 40/63; G16H 20/00; G16H 20/17; G16H 20/60; G16H 30/00; G16H 10/00; G16H 20/30; G16H 20/70
USPC ........................................................ 382/128
See application file for complete search history.

(56) References Cited

U.S. PATENT DOCUMENTS

2008/0243395 A1\* 10/2008 Oosawa ................. G16H 50/70
702/19
2019/0108912 A1\* 4/2019 Spurlock, III .......... A61P 25/28
2020/0188027 A1\* 6/2020 Sakuragi ............... G06T 7/0012

\* cited by examiner

*Primary Examiner* — Ajibola A Akinyemi
(74) *Attorney, Agent, or Firm* — Bayes PLLC

(57) ABSTRACT

This disclosure discloses a method for analyzing clinical data. The Method includes extracting a first feature information by applying a neural network to the clinical data; predicting a disease status related parameter by applying a regression model to the extracted first feature information; generating a second feature information based on the extracted first feature information and the disease status related parameter; and predicting a disease status classification result by applying a classification model to the second feature information. The method can improve the prediction accuracy and the diagnosis efficiency of doctors.

17 Claims, 9 Drawing Sheets

(51) Int. Cl.
*G16H 50/20* (2018.01)
*G16H 50/30* (2018.01)
*A61B 6/50* (2024.01)

METHOD AND SYSTEM FOR SIMULTANEOUS CLASSIFICATION AND REGRESSION OF CLINICAL DATA

CROSS REFERENCE TO RELATED APPLICATION

This application is based on and claims the priority of U.S. Provisional Application No. 63/178,923, filed Apr. 23, 2021, which is incorporated herein by reference in its entirety.

TECHNICAL FIELD

This disclosure relates to the field of clinical data analysis using artificial intelligence, especially to a method and system for simultaneous classification and regression of clinical data.

BACKGROUND

Machine learning methods are used to detect, analyze, and classify clinical data, which can assist doctors in diagnosing cancer risk grading, the degree of vascular stenosis, etc. In the prior art, two separate models are generally used for classification and regression respectively. For example, a regression model is used alone to predict a disease status related parameter, and a classification model is used alone to predict a classification result of disease status. The two models are executed independently and have no relationship.

FFR-based hemodynamic characteristics are important indicators to determine and evaluate the best treatment for patients with arterial disease. These accurate blood flow characteristics such as structural characteristics related to blood flow characteristics and vascular stenosis, for example, vascular radius, blood flow pressure drop, blood flow, etc., may be provided to doctors to evaluate vascular conditions accordingly. For example, a large number of clinical trials have proved that FFR may well guide the treatment of coronary artery stenosis and other vascular diseases.

The existing method using machine learning method to evaluate the vascular stenosis uses the classification model alone to predict the estimation score of FFR, and separately uses the regression model alone to predict the stenosis level of the vessel, etc. Without considering the correlation between these two predictions, the accuracy of prediction result is low and the prediction performance is poor.

SUMMARY

The embodiments of this disclosure aim to provide a method, a device and a computer-readable storage medium for classification and regression analysis of clinical data, which utilizes the regression model and the classification model for joint training to predict disease status, so that the prediction accuracy is higher.

In order to solve the above technical problems, the embodiments of this disclosure adopt the following technical solutions.

According to a first aspect of the present disclosure, this disclosure provides a computer-implemented method for analyzing clinical data. The method may include extracting a first feature information by applying a neural network to the clinical data to be analyzed. The method may further include predicting a disease status related parameter by applying a regression model to the extracted first feature information. The method may also include generating a second feature information based on the extracted first feature information and the disease status related parameter; and predicting a disease status classification result by applying a classification model to the second feature information.

According to a second aspect of the present disclosure, it provides a computer-implemented method for analyzing clinical data. The method may include extracting a first feature information by applying a neural network to the clinical data to be analyzed. The method may further include predicting a disease status classification result by applying a classification model to the extracted first feature information. The method may also include transforming the predicted disease status classification result into a one-hot representation and fusing it with the first feature information, to generate a second feature information. The method may additionally include predicting a disease status related parameter by applying a regression model to the second feature information.

According to a third aspect of the present disclosure, it provides a system for analyzing clinical data. The device may include an interface and a processor. The interface may be configured to receive the clinical data to be analyzed. The processor may be configured to extract a first feature information by applying a neural network to the clinical data to be analyzed. The processor may be configured to predict a disease status related parameter by applying a regression model to the extracted first feature information. The processor may be configured to generate a second feature information based on the extracted first feature information and the disease status related parameter. The processor may be configured to predict a disease status classification result by applying a classification model to the second feature information.

According to a fourth aspect of the present disclosure, it provides a system for analyzing clinical data. The device may include an interface and a processor. The interface may be configured to receive the clinical data to be analyzed. The processor may be configured to extract a first feature information by applying a neural network to the clinical data to be analyzed. The processor may be further configured to predict a disease status classification result by applying a classification model to the extracted first feature information. The processor may be configured to transform the predicted disease status classification result into a one-hot representation and fusing it with the first feature information, to generate a second feature information. The processor may also be configured to predict a disease status related parameter by applying a regression model to the second feature information.

According to a fifth aspect of the present disclosure, it provides a non-transitory computer-readable storage medium having computer executable instructions stored thereon. The computer-executable instructions, when executed by a processor, perform a method for analyzing clinical data according to the embodiments of this disclosure.

The method may include extracting a first feature information by applying a neural network to the clinical data to be analyzed. The method may further include predicting a disease status related parameter by applying a regression model to the extracted first feature information. The method may also include generating a second feature information based on the extracted first feature information and the disease status related parameter; and predicting a disease status classification result by applying a classification model to the second feature information.

According to a sixth aspect of the present disclosure, it provides a non-transitory computer-readable storage medium having computer executable instructions stored thereon. The computer-executable instructions, when executed by a processor, perform a method for analyzing clinical data according to the embodiments of this disclosure. The method may include extracting a first feature information by applying a neural network to the clinical data to be analyzed. The method may further include predicting a disease status classification result by applying a classification model to the extracted first feature information. The method may also include transforming the predicted disease status classification result into a one-hot representation and fusing it with the first feature information, to generate a second feature information. The method may additionally include predicting a disease status related parameter by applying a regression model to the second feature information.

The disclosed methods and systems provide several benefits. The method can fully consider the high correlation between the disease status related parameter and the disease status classification result, so that the predicted disease status classification result or the disease status related parameter is more accurate. In this manner, the prediction performance is improved and the prediction results are more accurate, thus helping improve the diagnosis efficiency of doctors.

DETAILED DESCRIPTION

In order for those skilled in the art to better understand this disclosure, the embodiments of this disclosure will be described in detail below with reference to the accompanying drawings, but not as a limitation to this disclosure.

Figure 1A:
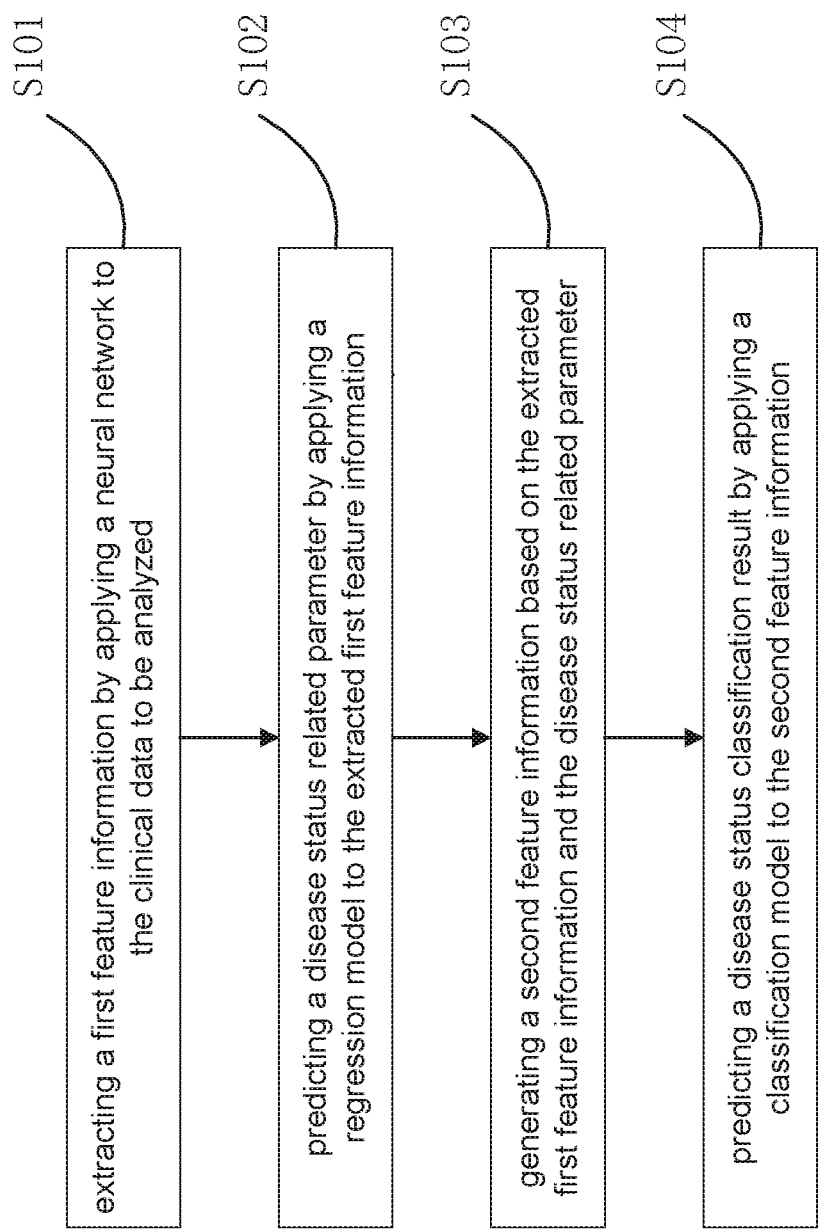
FIG. 1(a) illustrates a flow chart of a first method for simultaneous classification and regression of clinical data, according to an embodiment of this disclosure.
Figure 1B:
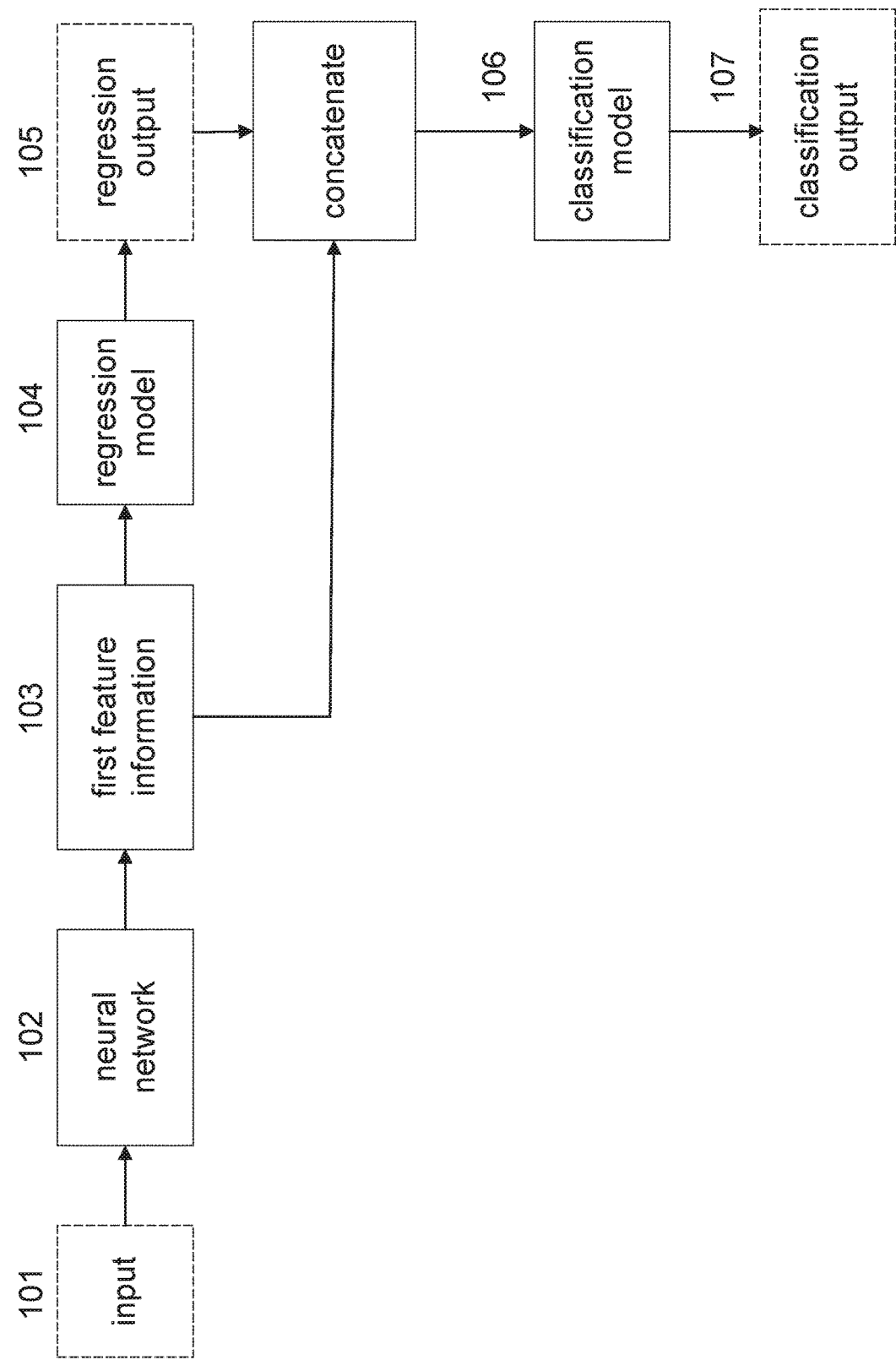
FIG. 1(b) illustrates a schematic diagram of the first method for simultaneous classification and regression of clinical data in FIG. 1(a), according to an embodiment of this disclosure.

This disclosure provides a method for classification and regression analysis of clinical data. FIG. 1(a) illustrates a flow chart of a first method for simultaneous classification and regression of clinical data according to an embodiment of this disclosure. FIG. 1(b) illustrates a schematic diagram of the first method for simultaneous classification and regression of clinical data in FIG. 1(a), according to an embodiment of this disclosure. FIGS. 1(a) and 1(b) will be described together. As shown in FIG. 1(a), the method starts from step S101, extracting a first feature information by applying a neural network to the clinical data to be analyzed.

A neural network algorithm is an algorithm mathematical model that imitates the behavior of neural network in the brain and performs distributed parallel information processing. This network relies on the complexity of the system and adjusts the interconnected relationship between internal neurons to process information. Using the trained neural network to process the obtained clinical data can quickly and accurately extract a first feature information related to disease status.

It should be noted that the neural network in this disclosure may be a neural network or a combination of several neural networks. For example, it may be one or a combination of a convolutional neural network (CNN), a multi-layer perceptron (MLP), a recurrent neural network (RNN), and a recurrent cortical network (RCN), and so on, as long as the used neural network can obtain the first feature information related to disease status based on the clinical data to be analyzed. This disclosure does not specifically limit this. In some embodiments, the RNN may include LSTM (Long Short Term Memory Neural Network), GRU (Gated Recurrent Unit), CGRU (Convolutional Gated Recurrent Unit), CLSTM (Convolutional Long Short-Term Memory Neural Network), etc.

It is contemplated that the clinical data to be analyzed in this disclosure may be physiological signals obtained by using various medical equipment, such as, electroencephalogram signal (EEG), electrocardiogram signal (ECG), blood oxygen signal (HbO2). It may also be medical images obtained by using various medical equipment, such as CT images, MRI images, ultrasound images, including but not limited to medical images containing anatomical structures, such as MRI images containing vessels, MRI images of brain structures. As long as the relevant information of the disease status can be obtained by analyzing the clinical data, this disclosure does not specifically limit this.

In S102, the method includes predicting a disease status related parameter as continuous values by applying a regression model to the extracted first feature information. It is contemplated that the regression model may implement the regression in various ways to predict the disease status related parameter as continuous value. For example, the regression model may be implemented by using a supervised learning algorithm, such as but not limited to logistic regression, support vector machine (SVM), K-Nearest neighbor, linear regression (LR), neural network, etc. For another example, the regression model may also be implemented by using a semi-supervised learning algorithm, such as but not limited to pure semi-supervised learning algorithm, transductive learning algorithm, etc. As long as the regression model can predict the disease status related parameter as continuous value, this disclosure does not specifically limit it.

In S103, the method includes generating a second feature information based on the extracted first feature information and the disease status related parameter.

In S104, the method includes predicting a disease status classification result by applying a classification model to the second feature information. For example, the classification model may be implemented by using a supervised learning algorithm, such as but not limited to decision trees, naive Bayes classifiers, logistic regression, support vector machines (SVM), and K-Nearest neighbor algorithm, Linear Regression (LR), neural network, etc. For another example, the classification model may also be implemented by using a semi-supervised learning algorithm, such as but not limited to pure semi-supervised learning algorithm, transductive learning algorithm, etc. For example, the classification model may also be implemented by using an unsupervised learning algorithm, such as but not limited to clustering algorithm, principal component analysis (PCA), SVD matrix factorization, independent component analysis (ICA), Apriori algorithm and K-means algorithm, sparse auto-encoder, etc., which are not repeated here.

Specifically, the disease status related parameter has a high correlation with the disease status classification. When the disease status related parameter is abnormal, the patient has a high possibility of suffering from this type of disease, and in some cases the disease degree may be determined according to the numerical range of the disease status related parameter. Taking a nodule as an example, the size, morphological boundary, blood flow calcification and other characteristics of the nodule are related to the grade of the nodule. According to the grade of the nodule, it can be judged whether the nodule has the possibility of malignant lesions, or whether malignant lesions have already occurred. Therefore, the high correlation between the disease status related parameter and the disease status classification result is fully considered to predict the disease status, which can obtain more accurate prediction results.

Therefore, in S103, the second feature information is generated based on the extracted first feature information and the disease status related parameter, so that in addition to the first feature information extracted by the implicit neural network, the second feature information also carries the explicit disease status related parameter information predicted by the regression model and is used as the input of the classification model in S104. As such, when the classification model predicts the disease status classification result based on the second feature information, the high correlation between the disease status related parameter and the disease status classification result can be taken into account, so that the classification result can be obtained with higher accuracy. Furthermore, the prediction result including both the disease status related parameter as continuous value and the disease status classification result is obtained to help to improve the diagnostic efficiency of doctors.

It should be noted that the following description of this disclosure takes a medical image containing vessel as an example to illustrate the technical solution of this disclosure, but this disclosure is not limited to this.

Taking the medical image containing vessel as an example, the first feature information 103 shown in FIG. 1(b) may be the feature information related to blood flow and geometry obtained based on the medical image. As long as it can be used to predict the status of the vessel, this disclosure does not specifically limit this.

Taking the use of RNN as the neural network 102 as an example. The image block of each point on the vascular pathway may be directly used as an input 101 of the neural network 102, and a feature map of each point on the vascular pathway may be extracted as the first feature information 103.

Then, the feature map of each point on the vascular pathway extracted by the neural network 102 may be used as the first feature information 103, and the regression model 104 may be used to predict the disease status related parameter as continuous value, as the regression output 105. For the vessel, the disease status related parameter may be, for example, the estimation score of the FFR of the vessel. Studies have shown that FFR-based hemodynamic characteristics are important indicators to determine and evaluate the best treatment for patients with arterial disease, and are provided to doctors for assessing the status of the vessel.

After that, the second feature information is generated based on the extracted feature map of each point on the vascular pathway (as an example of the first feature information 103) and the estimation score of the FFR of the vessel (as an example of the regression output 105). Based on the second feature information, the classification model 106 may be used to predict the stenosis level of the vessel as the classification output 107. Since the second feature information contains the feature map of each point on the vascular pathway related to the stenosis level of the vessel, and it also carries the estimation score of the FFR of the vessel that is highly correlated with the stenosis level of the vessel, it makes the prediction result of the classification model 106 more accurate.

The method for classification and regression analysis of clinical data in the embodiments of this disclosure has fully considered the high correlation between the disease status related parameter and the disease status classification result, and combines (or fuses) the disease status related parameter as continuous value predicted by the regression model 104 with the first feature information 103 extracted by the neural network 102 so as to generate the second feature information as the input of the classification model 106, so that the accuracy of the disease status classification result predicted by the classification model 106 is higher, which can help to improve the diagnostic efficiency of doctors.

In some embodiments, the clinical data may include medical image containing vessels, the disease status related parameter may include at least one of the estimation score of the FFR of the vessel and the plaque vulnerability risk score of the vessel, and the disease status classification result may include the corresponding one of the stenosis level and the plaque vulnerability level of the vessel. For evaluating the status of vessel disease, a large number of clinical trials have proved that the estimation score of the FFR of the vessel can well guide the treatment of coronary stenosis and other vessel diseases. For example, when the FFR value is greater than 0.8, a drug therapy is usually selected, and if the FFR value is less than or equal to 0.8, an interventional therapy need be considered. In addition, among vascular diseases, a considerable proportion of vascular diseases are caused by the accumulation of plaque on the vessel wall. When the plaque of the vessel ruptures, the patient may suffer from acute coronary syndrome, or even a more serious heart attack (myocardial infarction). Therefore, predicting the plaque vulnerability risk score of the vessel is also crucial for diagnosing and analyzing vascular diseases. For the medical image containing vessels, the estimation score of the FFR of the vessel and/or the plaque vulnerability risk score of the vessel are predicted as the related parameter for estimating the disease status of the vessel, and the stenosis level and/or the plaque vulnerability level of the vessel are predicted, thereby helping the doctors to analyze the disease status of the vessel more accurately so as to improve the diagnostic efficiency.

In some embodiments, the stenosis level of the vessel includes three levels, with the first level as no stenosis, the second level as non-significant stenosis, and the third level as significant stenosis; and/or the plaque vulnerability level of the vessel includes three levels, with the first level as non-vulnerable, the second level as vulnerability at low risk, and the third level as vulnerability at high risk. Specifically, from a clinical point of view, for different stenosis levels of the vessel and/or different plaque vulnerability levels of the vessel, different treatment plans are required. For example, in the case of significant stenosis, the implantation of a vessel stent is required to expand the vessel. When the plaque vulnerability level is non-vulnerable or vulnerability at low risk, it is sufficient to use drugs to maintain the current state of the plaque. Using the classification model to accurately predict the stenosis level and/or the plaque vulnerability level of the vessel can help the doctors to determine treatment plans faster and thus improve the work efficiency.

It is contemplated that a parameter threshold used to determine the stenosis level and/or the plaque vulnerability level of the vessel may be fixed in advance, or may be set by doctors themselves. In order to achieve more accurate assessment and diagnosis, the parameter threshold may be determined based on population samples, or may be personalized based on the patient's own vessel status.

In some embodiments, the regression model and the classification model may be implemented by using, for example, a learning network, and may be trained jointly by using a loss function. The loss function may include a regression loss term and a penalty term. The penalty term is defined to penalize the condition wherein the regression predicted value of the regression model belongs to a different disease status classification result from that the regression ground truth belongs. Therefore, the loss function does not need to calculate the regression loss and the classification loss separately and sum them up, but takes into account the classification deviation of the regression predicted value based on the regression loss, thereby simplifying the calculation of the loss function and ensuring the joint training effect of two tasks, namely, the regression and the classification.

For example, the loss function for joint training, also called as the joint loss function JL, may be determined by using a formula (1):

$$JL = h * \text{regression loss} + (1-h) * \text{penalty loss} \quad \text{formula (1)}$$

Wherein, the regression loss represents a regression loss term, while the penalty loss represents a penalty term, and h is the weight of two losses, namely, the regression loss and the penalty loss.

It is contemplated that the classification model and the regression model in this disclosure may be constructed based on a deep learning model. The deep learning model can effectively determine the disease status classification result of the vessel based on the medical image containing vessel. By training the deep learning model, the recognition efficiency of the model can be effectively improved.

After the classification model and the regression model are constructed, each model may be trained in advance. For example, labeled medical images containing vessels may be used as a training set. The training method may be determined according to actual needs. In the training process, the classification model and the regression model may be jointly trained by using the loss function to jointly adjust the parameters of the learning network.

In some embodiments, a loss function that is based on the regression model and takes into account the classification bias of the regression prediction results may be used as the joint loss function to jointly adjust the parameters of the regression model and the classification model. In this way, through the joint training, the regression model and the classification model may be obtained at the same time with better overall performance in the regression and classification prediction task. In other embodiments, the neural network used to extract the first feature information may also use the loss function, together with the regression model and the classification model, to jointly adjust the parameter. This disclosure does not specifically limit this.

Specifically, an example in which the disease status related parameter predicted by the regression model is used as the estimation score of the FFR of the vessel, and the disease state classification result predicted by the classification model is used as the stenosis level of the vessel is taken. In the process of training the regression model by using the training sample sets, a case where the regression predicted value output by the regression model and the regression ground truth of the sample respectively belong to different stenosis levels of the vessel may occur. In this case, it is necessary to penalize the parameters of the current stage of the learning models (that is, the regression model and the classification model) to obtain a model with higher prediction accuracy. For example, where the estimation score of the FFR of the vessel predicted by the regression model is 0.9, theoretically, the stenosis level of the vessel does not belong to the category of significant stenosis, while where the regression ground truth of the sample is 0.5, the stenosis level of the vessel should belong to the category of significant stenosis. Obviously, the regression predicted value output by the regression model and the regression ground truth correspond to two significantly different classification results, indicating that the regression predicted value is not accurate enough and the model needs to be penalized to optimize the parameters of the model.

In some embodiments, the penalty term may be set as a fixed value, or may be determined according to the actual prediction result. For example, the penalty term may be determined based on the deviation between the regression predicted value and the regression ground truth.

In some embodiments, penalizing the condition wherein the regression predicted value of the regression model belongs to a different disease status classification result from that the regression ground truth belongs may specifically include: in case that the regression predicted value and the regression ground truth are distributed at the same side of a preset threshold for disease status classification, the penalty term can be set to zero, that is, the model is not penalized. In the case that the regression predicted value and the regression ground truth are distributed at different sides of a preset threshold, causing the penalty term to increase as the deviation between the regression predicted value and the regression ground truth increases.

Specifically, the preset threshold may correspond to the classification of the disease status. For example, the size of the nodule is related to the classification of the nodule, and the preset threshold may be a size range of the nodule. For another example, the estimation score of the FFR of the vessel is related to the stenosis level of the vessel, and the preset threshold may be the estimation score value of the FFR of the vessel. The preset threshold is used as a boundary of the disease status classification result. The predicted value on the side lower than the preset threshold belongs to a first classification, while the predicted value on the other side higher than the preset threshold belongs to a second classification different from the first classification. According to the distribution of the regression predicted value and the regression ground truth relative to the preset threshold for the disease status classification, it may be determined whether the disease status classifications corresponding to the regression predicted value and the regression ground truth respectively are similar or the same. In the case of being similar or the same, it means that the regression predicted value performs better on the classification task and thus has a higher accuracy, and the penalty may not be performed on the model. However, in the case where the regression predicted value and the regression ground truth are distributed at different sides of the preset threshold, it means that the regression predicted value and the regression ground truth correspond to different disease status classifications respectively, and have poor performance on the classification task and poor accuracy, and thus the penalty needs to be performed on the model. Preferably, the penalty term may be set to increase as the deviation between the regression predicted value and the regression ground truth increases. The larger deviation means the larger classification difference between the disease statuses corresponding to the regression predicted value and the regression ground truth respectively, and thus the accuracy of the prediction result is lower. Setting the penalty term to increase as the deviation increases can achieve the better training effect, and thus obtain the more accurate prediction result.

In some embodiments, the penalty term is a threshold regularization loss, and is represented by a formula (2):

$$\begin{cases} \dfrac{P-t}{GT_R - t} > 0, L = 0 \\ \dfrac{P-t}{GT_R - t} \leq 0, L = \exp(X), X = (P - GT_R)^2 \end{cases} \quad \text{formula (2)}$$

Figure 2:
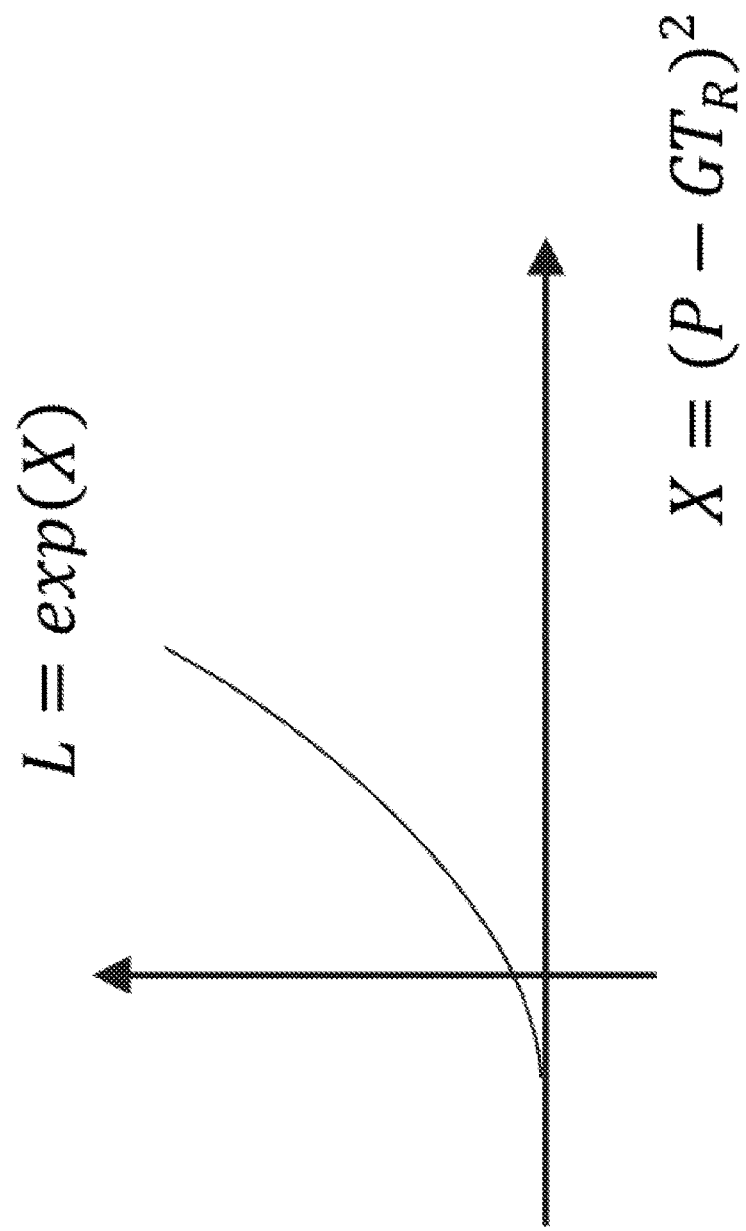
FIG. 2 illustrates a graph of a penalty term of an exemplary loss function for joint training of a regression model and a classification model, according to an embodiment of this disclosure.

Wherein, P represents the regression predicted value, t represents the preset threshold, $GT_R$ represents the regression ground truth, and L represents the penalty term, as shown in FIG. 2.

In a specific embodiment, the regression model predicts the estimation score of the FFR of the vessel, and the estimation score of the FFR ranges from 0 to 1. Studies have shown that when the estimation score of the FFR is greater than 0.8, it means that the status of the vessel is good and no interventional treatment is required; and when the estimation score of the FFR is lower than 0.8, it means that the vessel is significant stenosis, and the interventional treatment is required for the vessel. In this embodiment, the preset threshold t may be set to 0.8. When $$\dfrac{P-t}{GT_R - t} > 0,$$

it means that the estimation score of the FFR of the vessel predicted by the regression model and the regression ground truth are distributed at the same side of t. For example, in a case where p=0.85 and $GT_R$=0.9, it means that the prediction accuracy of the regression model is good, and the penalty may not be performed on the model, then the penalty term L=0.

In some embodiments, generating the second feature information based on the extracted first feature information and the disease status related parameter may specifically include: extending the extracted first feature information into a one-dimensional vector and concatenating it with the disease status related parameter, as shown in FIG. 1 (b), so as to obtain the second feature information. As such, the second feature information contains the first feature information and the disease status related parameter predicted by the regression model at the same time, and is input into the classification model, so that the more accurate disease status classification result can be obtained.

Figure 3A:
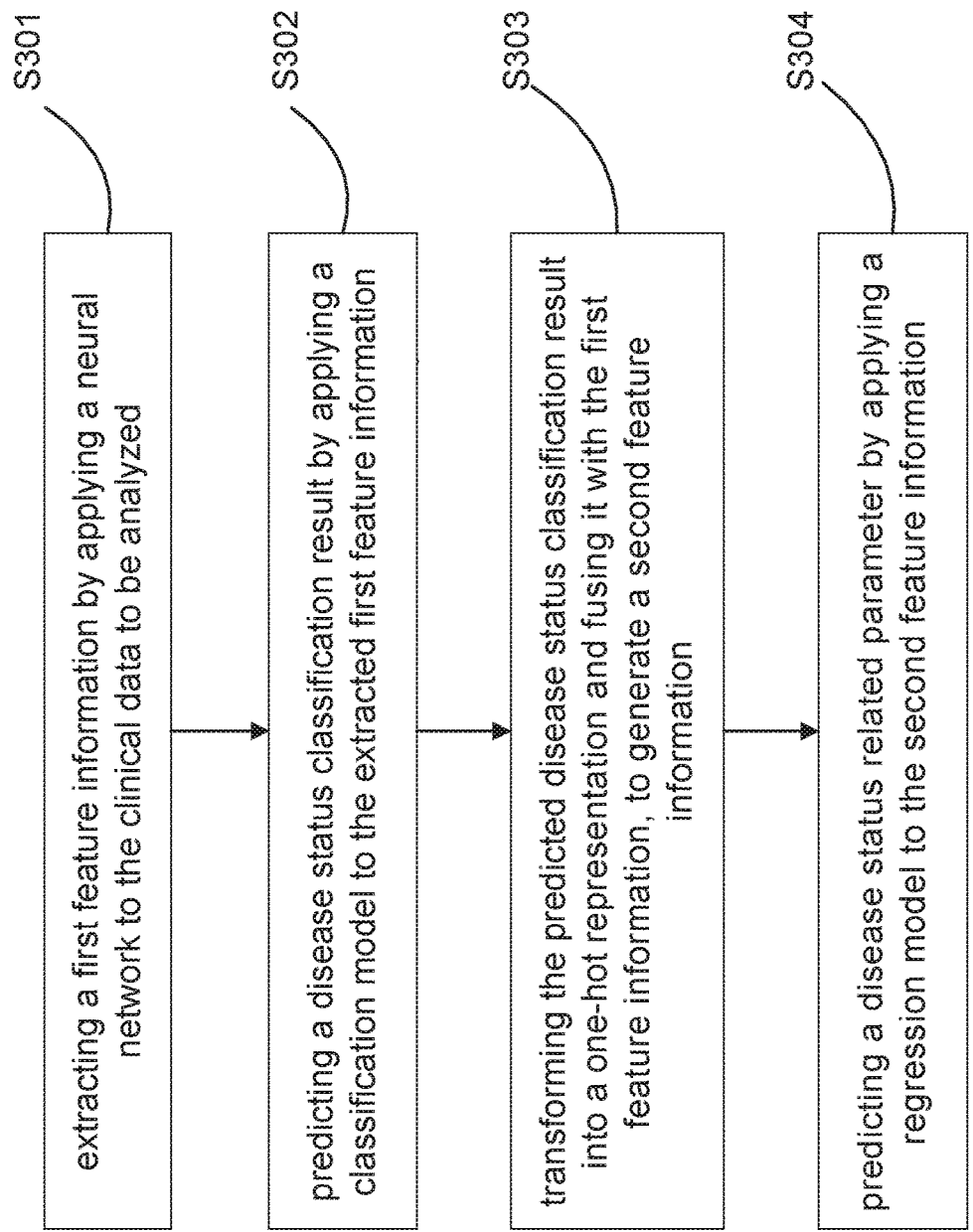
FIG. 3(a) illustrates a flow chart of a second method for simultaneous classification and regression of clinical data, according to another embodiment of this disclosure.
Figure 3B:
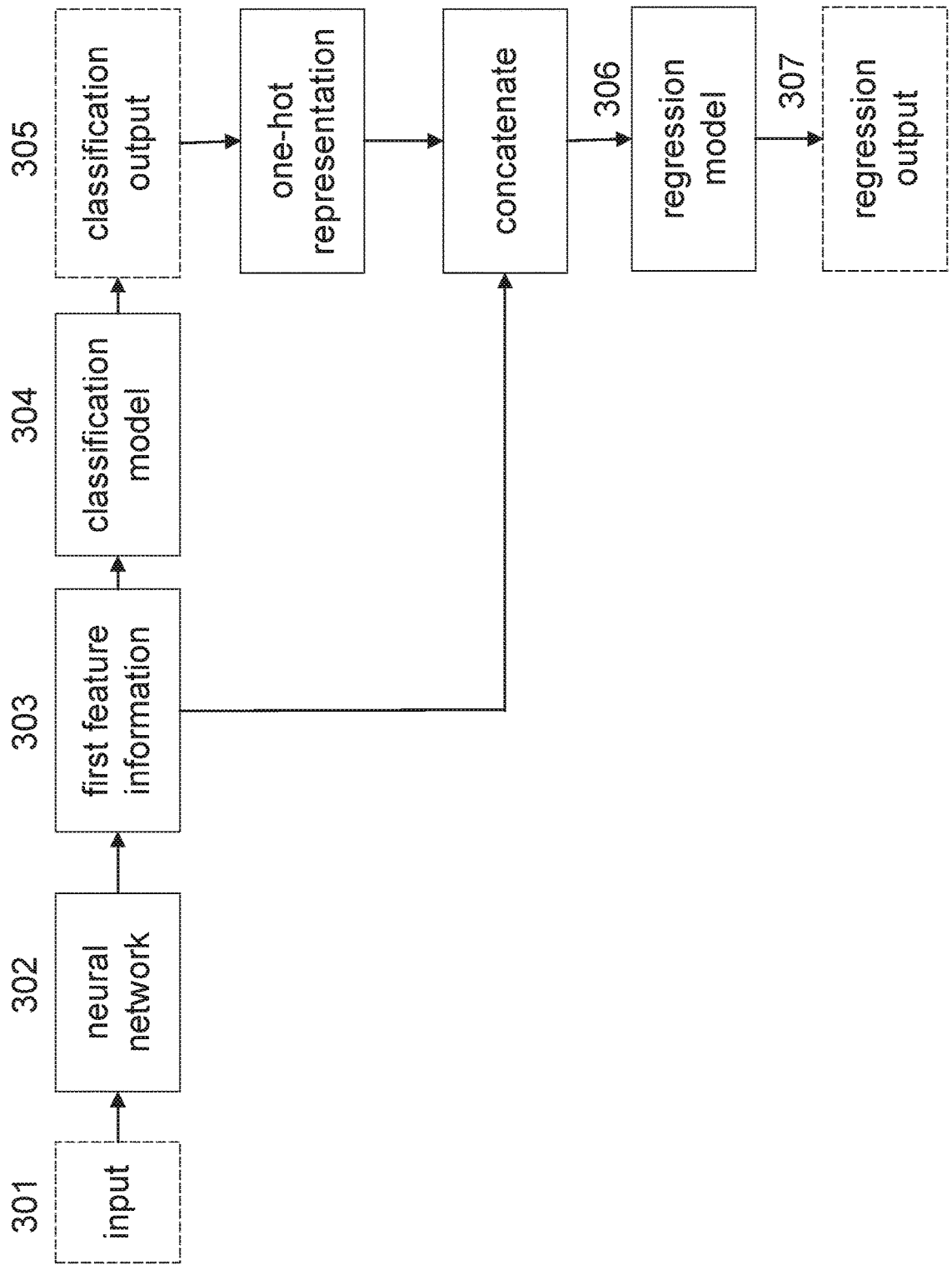
FIG. 3(b) is a schematic diagram of the second method for simultaneous classification and regression of clinical data in FIG. 3(a), according to an embodiment of this disclosure.

FIG. 3(a) illustrates a second method for simultaneous classification and regression of clinical data, according to another embodiment of this disclosure. FIG. 3(b) is a schematic diagram of the second method for simultaneous classification and regression of clinical data in FIG. 3(a), according to an embodiment of this disclosure. FIGS. 3(a) and 3(b) will be described together. As shown in FIG. 3(a), the method starts from the step S301, extracting a first feature information by applying a neural network to the clinical data to be analyzed. In S302, the method may include predicting a disease status classification result by applying a classification model to the extracted first feature information. In S303, the method may include transforming the predicted disease status classification result into a one-hot representation and fusing it with the first feature information, so as to generate a second feature information. In S304, the method may include predicting a disease status related parameter as continuous value by applying a regression model to the second feature information.

Specifically, after using the neural network to extract the first feature information, at first the classification model is used to predict the disease status classification result based on the extracted first feature information, and then the regression model is used to predict the disease status related parameter as continuous value based on the first feature information and the disease status classification result predicted by the classification model. The description of the clinical data to be analyzed, the neural network, the regression model and the classification model and so on will not be repeated here.

As shown in FIG. 3(b), an example in which the medical image containing vessels is used as the input 301, and the first feature information 303 may be a feature map is taken. At first, the trained neural network 302 is used to extract the feature map as the first feature information 303. In the case of using the RNN as the neural network 302, an image block of each point along the center line of the vessel may also be used as the input so as to extract the feature map at each point as the first feature information 303. Based on the extracted first feature information 303 (such as but not limited to feature maps), the classification model 304 may be used to predict the plaque vulnerability level of the vessel (i.e., the classification output 305). After transforming the plaque vulnerability level of the vessel, it is fused with the first feature information 303 (such as but not limited to feature maps) as the input of the regression model 306. The regression model 306 is used to predict the plaque vulnerability risk score of the vessel (i.e., the regression output 307).

Specifically, the prediction result output by the classification model 306 is generally the category of the disease status. For example, the prediction result is a text feature such as a first category and a second category. The prediction result needs to be transformed so as to be fused with the first feature information 303 to generate the second feature information. The one-hot representation as shown in FIG. 3(b) may convert the text feature information into vectors. Therefore, the one-hot representation may be used to transform the predicted disease status classification result into vectors that may be fused with the first feature information 303. For example, the first category of the prediction result is transformed into a vector [1 0 0], and the second category of the prediction result is transformed into a vector [0 1 0].

The method for classification and regression analysis of clinical data described above fully considers the high correlation between the disease status related parameter and the disease status classification result, uses the classification model 306 to predict the disease status classification result, and uses the second feature information generated by fusing the disease status classification result with the first feature information 303 extracted by the neutral network 302 as the input of the regression model 306, so that the accuracy of the disease status related parameter predicted by the regression model 306 is higher, which can help to improve the diagnostic efficiency of doctors.

In some embodiments, the clinical data may include medical image containing vessels, the disease status related parameter may include at least one of the estimation score of the FFR of the vessel and the plaque vulnerability risk score of the vessel, and the disease status classification result may include the corresponding one of the stenosis level and the plaque vulnerability level of the vessel. For evaluating the status of vessel disease, a large number of clinical trials have proved that the estimation score of the FFR of the vessel can well guide the treatment of coronary stenosis and other vessel diseases. For example, when the FFR value is greater than 0.8, a drug therapy is usually selected, and if the FFR value is less than or equal to 0.8, an interventional therapy need be considered. In addition, among vascular diseases, a considerable proportion of vascular diseases are caused by the accumulation of plaque on the vessel wall. When the plaque of the vessel ruptures, the patient may suffer from acute coronary syndrome, or even a more serious heart attack (myocardial infarction). Therefore, predicting the plaque vulnerability risk score of the vessel is also crucial for diagnosing and analyzing vascular diseases. For the medical image containing vessels, the estimation score of the FFR of the vessel and/or the plaque vulnerability risk score of the vessel are predicted as the related parameter for estimating the disease status of the vessel, and the stenosis level and/or the plaque vulnerability level of the vessel are predicted, thereby helping the doctors to analyze the disease status of the vessel more accurately so as to improve the diagnostic efficiency.

In some embodiments, the stenosis level of the vessel includes three levels, with the first level as no stenosis, the second level as non-significant stenosis, and the third level as significant stenosis; and/or the plaque vulnerability level of the vessel includes three levels, with the first level as non-vulnerable, the second level as vulnerability at low risk, and the third level as vulnerability at high risk. Specifically, from a clinical point of view, for different stenosis levels of the vessel and/or different plaque vulnerability levels of the vessel, different treatment plans are required. For example, in the case of significant stenosis, the implantation of a vessel stent is required to expand the vessel. When the plaque vulnerability level is non-vulnerable or vulnerability at low risk, it is sufficient to use drugs to maintain the current state of the plaque. Using the classification model to accurately predict the stenosis level and/or the plaque vulnerability level of the vessel can help the doctors to determine treatment plans faster and thus improve the work efficiency.

It is contemplated that a parameter threshold used to determine the stenosis level and/or the plaque vulnerability level of the vessel may be fixed in advance, or may be set by doctors themselves. In order to achieve more accurate assessment and diagnosis, the parameter threshold may be determined based on population samples, or may be personalized based on the patient's own vessel status.

In some embodiments, the regression model and the classification model may be implemented by using, for example, a learning network, and may be trained jointly by using a loss function. The loss function may include a regression loss term weighted by using a penalty weight. The penalty weight is defined to penalize the condition wherein the regression predicted value of the regression model belongs to a different disease status classification result from that the regression ground truth belongs. Therefore, the loss function is based on the regression loss term and adjusts it considering the performance of the regression predictions on the classification task, thereby simplifying the calculation of the loss function and ensuring the joint training effect of two tasks, namely, the regression and the classification.

It is contemplated that the classification model and the regression model in this disclosure may be constructed based on a deep learning model. The deep learning model can effectively determine the disease status classification result of the vessel based on the medical image containing vessel. By training the deep learning model, the recognition efficiency of the model can be effectively improved.

After the classification model and the regression model are constructed, each model may be trained in advance. For example, labeled medical images containing vessels may be used as a training set. The training method may be determined according to actual needs. In the training process, the classification model and the regression model may be jointly trained by using the loss function to jointly adjust the parameters of the learning network.

In some embodiments, a loss function that is based on the regression model and takes into account the classification bias of the regression prediction results may be used as the joint loss function to jointly adjust the parameters of the regression model and the classification model. In this way, through the joint training, the regression model and the classification model may be obtained at the same time with better overall performance on the regression and classification prediction task. In other embodiments, the neural network used to extract the first feature information may also use the loss function, together with the regression model and the classification model, to jointly adjust the parameter. This disclosure does not specifically limit this.

Specifically, an example in which the disease status related parameter predicted by the regression model is used as the estimation score of the FFR of the vessel, and the disease state classification result predicted by the classification model is used as the stenosis level of the vessel is taken. In the process of training the regression model by using the training sample sets, a case where the regression predicted value output by the regression model and the regression ground truth of the sample respectively belong to different stenosis levels of the vessel may occur. In this case, it is necessary to penalize the parameters of the current stage of the learning models (that is, the regression model and the classification model) to obtain a model with higher prediction accuracy. For example, where the estimation score of the FFR of the vessel predicted by the regression model is 0.9, theoretically, the stenosis level of the vessel does not belong to the category of significant stenosis, while where the regression ground truth of the sample is 0.5, the stenosis level of the vessel should belong to the category of significant stenosis. Obviously, the regression predicted value output by the regression model and the regression ground truth correspond to two significantly different classification results, indicating that the regression predicted value is not accurate enough and the model needs to be penalized to optimize the parameters of the model.

In some embodiments, the penalty term may be set as a fixed value, or may be determined according to the actual prediction result. For example, the penalty term may be determined based on the deviation between the regression predicted value and the regression ground truth.

In some embodiments, penalizing the condition wherein the regression predicted value of the regression model belongs to a different disease status classification result from that the regression ground truth belongs may specifically include: in case that the regression predicted value and the regression ground truth are distributed at the same side of a preset threshold for disease status classification, the penalty weight is smaller compared to the penalty weight in case the regression predicted value and the regression ground truth are distributed at different sides of the preset threshold, and/or the penalty weight to increases as the deviation between the regression predicted value and the regression ground truth increases.

Specifically, the preset threshold may correspond to the classification of the disease status. For example, the size of the nodule is related to the classification of the nodule, and the preset threshold may be a size range of the nodule. For another example, the estimation score of the FFR of the vessel is related to the stenosis level of the vessel, and the preset threshold may be the estimation score value of the FFR of the vessel. The preset threshold is used as a boundary of the disease status classification result. The predicted value on the side lower than the preset threshold belongs to a first classification, while the predicted value on the other side higher than the preset threshold belongs to a second classification different from the first classification. Specifically, in case that the regression predicted value and the regression ground truth are distributed at the same side of a preset threshold for disease status classification, it means that the disease status classifications corresponding to the regression predicted value and the regression ground truth respectively are similar or the same, and thus the regression predicted value performs better on the classification task and thus has a higher accuracy, compared to the case that the regression predicted value and the regression ground truth are distributed at different sides of the preset threshold for disease status classification, a smaller penalty weight can be used to penalize the model. The greater the deviation between the regression predicted value and the regression ground truth value is, the greater the difference between the disease status classifications corresponding to the regression predicted value and the regression ground truth value is, the performance on the classification task is poorer and thus the accuracy is poorer. Therefore, in other embodiments, the penalty weight may be set to increase as the deviation between the regression predicted value and the regression ground truth increases, in order to increase the penalty for the model with a lower prediction result accuracy and improve the prediction accuracy of the model.

Figure 4:
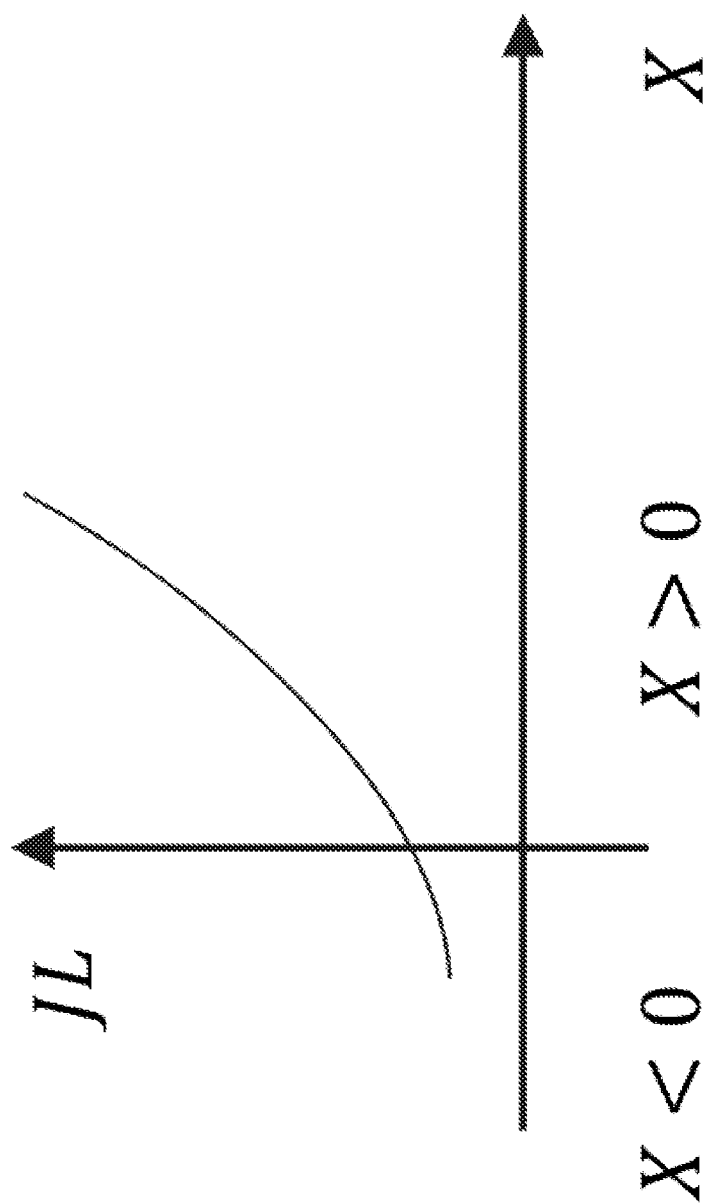
FIG. 4 illustrates a graph of another exemplary loss function for joint training of a regression model and a classification model, according to an embodiment of this disclosure.

In some embodiments, the loss function is represented by a formula (3):

$$JL = [1 + \exp(X)](P - GT_R)^2, X = -\frac{P - t}{GT_R - t} \quad \text{formula (3)}$$

wherein, P represents the regression predicted value, t represents the preset threshold, $GT_R$ represents the regression ground truth, and JL represents loss function. As shown in FIG. 4, in the case where X is greater than 0, that is, in the case where the regression predicted value and the regression ground truth are distributed at different sides of the preset threshold for disease status classification, the larger the deviation between the regression predicted value P and the regression ground truth $GT_R$ is, the larger the loss function JL is. Where X is less than 0, that is, where the regression predicted value and the regression ground truth are distributed at the same side of the preset threshold for disease status classification, the smaller the deviation between the regression predicted value P and the regression ground truth $GT_R$ is, the smaller the loss function JL is.

Taking the regression model predicting the estimation score of the FFR of the vessel as an example, the preset threshold t may be set to 0.8. The larger X is, it means that the larger the deviation between the estimation score of the FFR of the vessel predicted by the regression model and the regression ground truth is, the larger the loss function JL is, and thus the model needs a heavier penalty.

In some embodiments, fusing the one-hot representation with the first feature information so as to generate the second feature information further includes: extending the one-hot representation into a one-dimensional vector, extending the first feature information into a one-dimensional vector, and concatenating the extended two one-dimensional vectors, so as to obtain the second feature information. The predicted disease status classification result may be extended into a one-dimensional vector by using the one-hot representation, so that it may be fused with the first feature information to generate the second feature information containing the disease status classification result, thereby improving the prediction accuracy of the regression model.

Figure 5A:
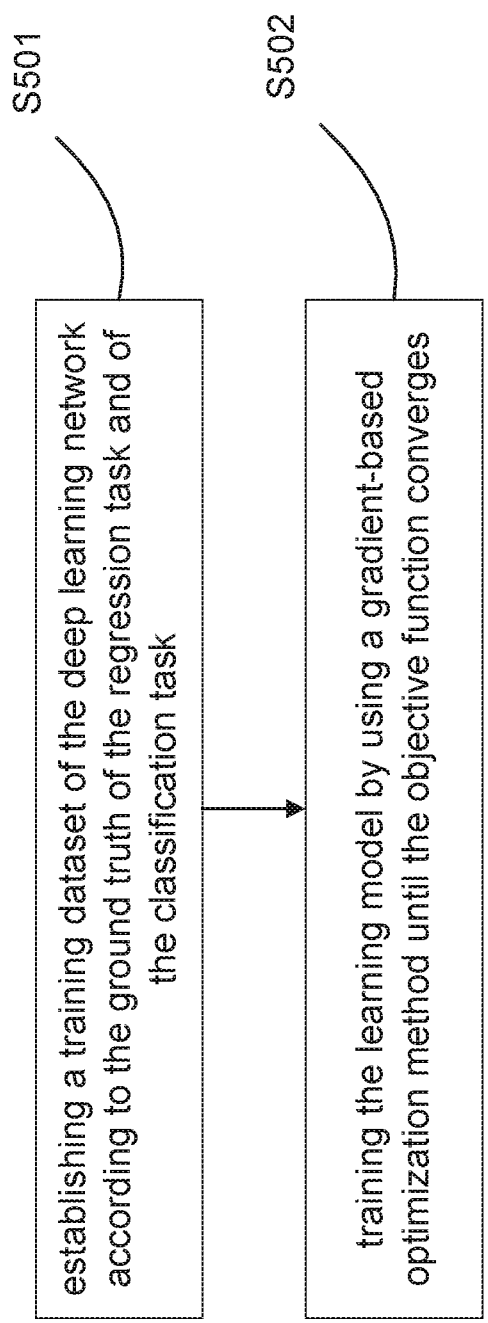
FIG. 5(a) illustrates a flow chart of an offline training of a regression model and a classification model, according to an embodiment of this disclosure.
Figure 5B:
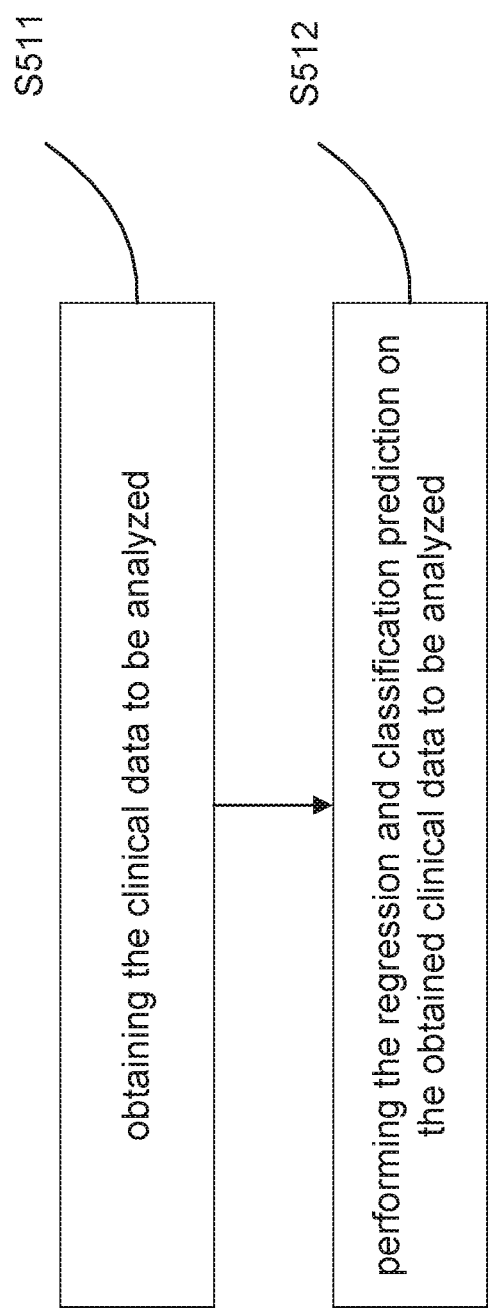
FIG. 5(b) illustrates a flow chart of an online simultaneous classification and regression of clinical data, according to an embodiment of this disclosure.

It is contemplated that the process of training the regression model and the classification model may be offline. FIG. 5(a) illustrates a flow chart of an offline training of the regression model and the classification model in the embodiments of this disclosure. As shown in FIG. 5(a), in S501, the method may include establishing a training dataset of the deep learning network according to the ground truth of the regression task and of the classification task, and the training dataset with the ground truth is used to jointly train the established regression model and the established classification model. In S502, the method may include training the learning model by using a gradient-based optimization method until the objective function converges. FIG. 5(b) illustrates a flow chart of an online simultaneous classification and regression of clinical data to be analyzed, according to an embodiment of this disclosure. As shown in FIG. 5(b), first in S511, the method may include obtaining the clinical data to be analyzed. Then in S512, the method may include using the regression model and the classification model trained in FIG. 5(a) to predict the disease status related parameter and the classification result for the obtained clinical data to be analyzed.

By arranging the training process of the time-consuming and computation-heavy learning model to be performed offline, a computationally efficient deep learning model may be trained for the needs of specific patients and/or doctors. When disease status needs to be predicted, it can directly use the off-the-shelf trained learning model to make predictions, which takes less time and can meet clinical needs.

Figure 6:
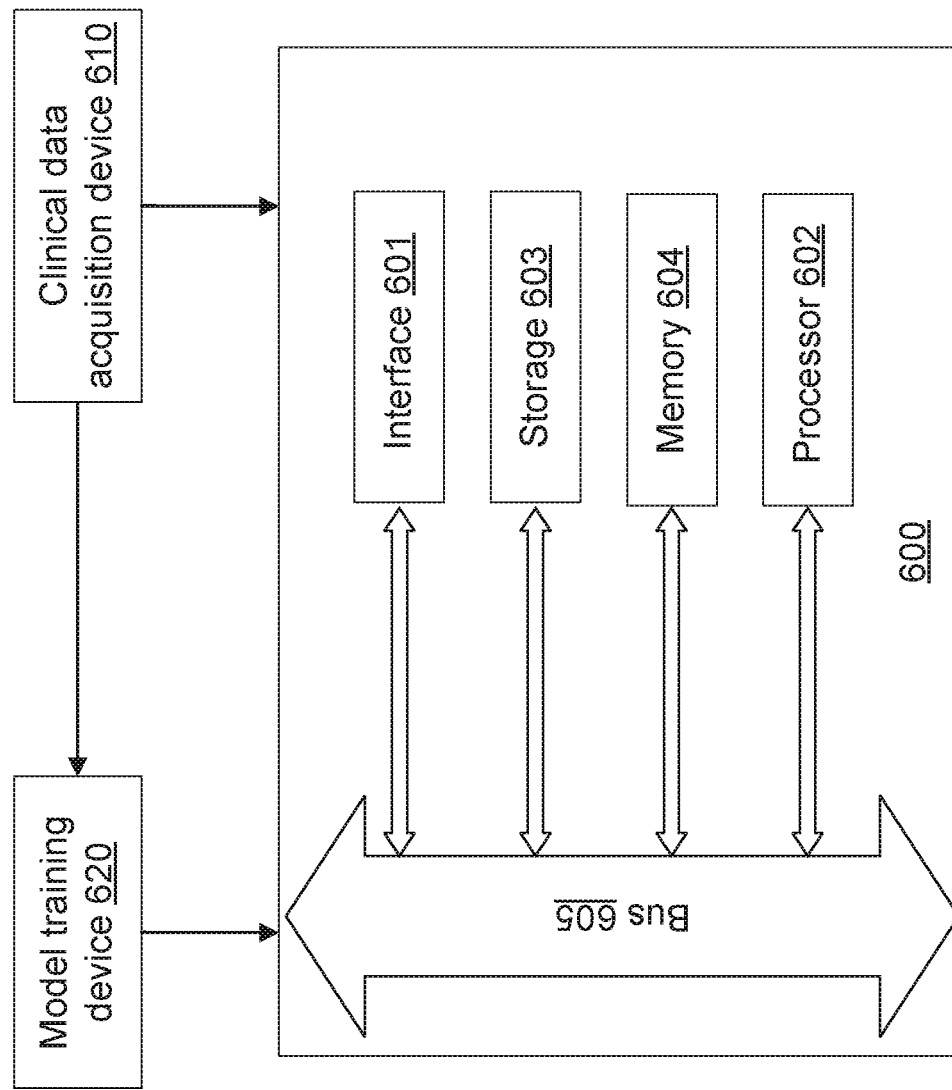
FIG. 6 is a block diagram of a system for simultaneous classification and regression of clinical data, according to an embodiment of this disclosure.

This disclosure further provides a device for classification and regression analysis of clinical data. FIG. 6 illustrates a system 600 for simultaneous classification and regression of clinical data, according to an embodiment of this disclosure. As shown in FIG. 6, the system 600 includes an interface 601 and a processor 602. The interface 601 is configured to receive clinical data to be analyzed. The processor 602 is configured to execute the method for classification and regression analysis of clinical data according to the embodiments of this disclosure.

Specifically, as shown in FIG. 6, the interface 601 may receive the clinical data to be analyzed sent by the external clinical data acquisition device 610, and provide the clinical data to be analyzed to the processor 602. The processor 602 uses the trained regression model and the trained classification model to predict the disease status related parameter as continuous value and the disease status classification result. The model training device 620 is used to construct and train the regression model and the classification model, and may send the trained regression model and the trained classification model to the system 600. As such, the system 600 can, when receiving the clinical data to be analyzed sent by the clinical data acquisition device 610 via the interface 601, use the trained regression model and the trained classification model to predict the disease status related parameter as continuous value and the disease status classification result.

In some embodiments, the model training device 620 may additionally include an input and output interface for communicating with the training database, the network, and/or a user interface. The user interface may be used to select a training dataset, adjust one or more parameters of the training process, select or modify a framework of the learning model, and/or manually or semi-automatically provide prediction results associated with image sequences for training.

In some embodiments, the acquired feature information together with the prediction results may also be stored in or fed to the model training device 620 as new training samples, so as to continuously update the training data sets and continuously improve the performance of the trained learning network. In addition, the stored parameters of the previously trained prediction model may be adopted as initial parameters of the prediction model during post-training, which can greatly speed up the training process.

In some embodiments, as shown in FIG. 6, the system 600 may also include a storage 603, a memory 604 and a bus 605. The interface 601, the storage 603, the memory 604 and the processor 602 are connected to the bus 605 and can communicate with each other through the bus 605.

It is contemplated that the storage 603 may store trained learning models and data, such as feature information generated when the computer program is executed, etc. In some embodiments, the memory 604 may store computer-executable instructions, such as one or more data processing programs, and computer-executable instructions may also be loaded from the storage 603. In some embodiments, feature information may be extracted at different granularities from data segments stored in the storage 603. In some embodiments, feature information may be read from the storage 603 one by one or simultaneously and loaded into the memory 604. The processor 602 may be communicatively associated with the memory 604 and configured to execute computer-executable instructions stored thereon.

In some embodiments, the regression model and the classification model in this disclosure may be stored or loaded into the memory 604. Alternatively, the learning network may be stored in a remote device, a separate database, a distributed device, and may be used by one or more data processing programs.

In some embodiments, the model training device 620, the clinical data acquisition device 610 and the system 600 may be integrated within the same computer or processing device.

In some embodiments, the interface 601 may include, but not limited to, a network adaptor, a cable connector, a serial connector, a USB connector, a parallel connector, a high-speed data transfer adaptor such as optical fiber, USB 3.0 and Thunderbolt interface, a wireless network adaptor such as a WiFi adaptor, a Telecommunication (3G, 4G/LTE, etc.) adaptor.

In some embodiments, the interface 601 may be a network interface, and the system 600 may be connected to a network through the interface 601, such as but not limited to a local area network in a hospital or the Internet. The network may connect the system 600 with external devices such as the clinical data acquisition device 610, a clinical data repository and a clinical data storage device (not shown). The clinical data acquisition device 610 may also employ various imaging modalities such as but not limited to, computed tomography (CT), Digital Subtraction Angiography (DSA), Magnetic Resonance Imaging (MRI), functional MRI, dynamic contrast enhancement—MRI, diffusion MRI, spiral CT, Cone Beam Computed Tomography (CBCT), Positron Emission Tomography (PET), Single-Photon Emission Computed Tomography (SPECT), X-ray imaging, optical tomography, fluorescence imaging, ultrasound imaging, radiotherapy portal imaging, etc.

In some embodiments, the system 600 may be a dedicated intelligent device or a general intelligent device. For example, the system 600 may be a computer customized for clinical data acquisition and clinical data processing tasks, or a server provided in a cloud. For example, the system 600 may be integrated into the clinical data acquisition device 610.

In some embodiments, the processor 602 may be a processing device that includes one or more general purpose processing device, such as a micro-processor, a central processing unit (CPU) and a graphics processing unit (GPU), etc. More specifically, the processor 602 may be a complex instruction set computing (CISC) micro-processor, a reduced instruction set computing (RISC) micro-processor, a very long instruction word (VLIW) micro-processor, and a processor that runs other instruction sets or a combination of instruction sets. The processor 602 may also be one or more dedicated processing device, such as an application dedicated Integrated circuit (ASIC), a field programmable gate array (FPGA), a digital signal processor (DSP) and a system on chip (SoC).

In some embodiments, the processor 602 may be a dedicated processor instead of a general-purpose processor. The processor 602 may include one or more known processing devices, such as microprocessors of Pentium™, Core™, Xeon™ or Itanium™ series manufactured by Intel™. The disclosed embodiments are not limited to any type of processor 602 or processor circuit, which are configured in other ways to meet the computational needs of identifying, analyzing, maintaining, generating and/or providing large amounts of clinical data or manipulating such clinical data to provide disease status predictions, or the computational needs of manipulating any other type of data consistent with the disclosed embodiments. In addition, the processor 602 may include one or more processor, for example, a multi-core design or a plurality of processors, each of which has a multi-core design.

In some embodiments, the memory 604 may store one or more software application programs. The software application programs stored in the memory 604 may include, for example, an operating system (not shown) for a general-purpose computer system and an operating system for a soft control device. In addition, the memory 604 may store the entire software application program or only a part of the software application program executable by the processor 602. In addition, the memory 604 may store a plurality of software modules for achieving individual steps of the method for classification and regression analysis of clinical data or processes for training the classification model and the regression mode, which are consistent with the present disclosure.

In some embodiments, the memory 604 may also store data generated/buffered while executing the computer program, e.g., clinical data, including clinical data sent from the clinical data acquisition device(s) 610, medical image databases, image data storage devices, etc. In some embodiments, the memory 604 may be a non-transitory computer readable medium, such as a read only memory (ROM), a random access memory (RAM), a phase-change random access memory (PRAM), a static random access memory (SRAM), a dynamic random access memory (DRAM), an electrically erasable programmable read-only memory (EEPROM), other types of random access memory (RAM), a flash disk or other forms of flash memory, a cache, a register, a static memory, a compact disc read only memory (CD-ROM), a digital versatile disc (DVD) or other optical storage, cassette tape or other magnetic storage devices, or any other non-transitory storage device for storing information or instructions that can be accessed by computer equipment, etc.

In some embodiments, the model training device 620 may be implemented with a hardware specially programmed by software that performs the training phase. For example, the model training device 620 may include a processor and a non-transitory computer readable medium. The processor 602 may carry out the training by executing instructions for the training process stored in the computer readable media. The device for classification and regression analysis of clinical data provided by this disclosure can fully consider the high correlation between the disease status related parameter and the disease status classification result, and associate the regression model and the classification model, thereby improving the predictive performance of the learning model, making the prediction result more accurate so as to help to improve the diagnostic efficiency of doctors.

This disclosure further provides a computer storage medium having computer executable instructions stored thereon. The computer executable instructions, when executed by the processor, perform the method for classification and regression analysis of clinical data according to the embodiments of the present disclosure.

It is contemplated that the computer readable storage medium may include such as but not limited to a read only memory (ROM), a random access memory (RAM), a phase-change random access memory (PRAM), a static random access memory (SRAM), a dynamic random access memory (DRAM), an electrically erasable programmable read only memory (EEPROM), other types of random access memory (RAM) (RAM), a flash disk or other forms of flash memory, a cache, a register, a static memory, a compact disc read only memory (CD-ROM), a digital versatile disc (DVD) or other optical storage, a cassette tape or other magnetic storage devices, or any other non-transitory storage device for storing information or instructions that can be accessed by computer device, etc.

Various operations or functions are described herein, which may be implemented or defined as software code or instructions. Such content may be directly executable source code ("object" or "executable" form) or differential code ("increment" or "patch" code). Software implementations of the embodiments described herein may be provided via an article having code or instructions stored therein or via a method of operating a communication interface to send data via the communication interface. The machine or the computer-readable storage medium may cause the machine to perform the functions or operations described, and may include any mechanism for storing information in a form accessible by the machine (e.g., a computing device, an electronic system, etc.), such as a recordable/non-recordable medium (for example, a read-only memory (ROM), a random access memory (RAM), a disk storage medium, an optical storage medium, a flash memory device, etc.). The communication interface may include any mechanism that couples to any one of hardwired, wireless and optical media and so as to communicate with another device, such as a memory bus interface, the processor bus interface, an internet connection, a disk controller, etc. The communication interface may be configured by providing configuration parameters and/or signaling so that the communication interface is configured to prepare the communication interface to provide data signals describing the content of the software. The communication interface may be accessed via one or more commands or signals sent to the communication interface.

The above embodiments are only exemplary embodiments of this disclosure, and are not intended to limit this disclosure. The protection scope of this disclosure is defined by the claims. Those skilled in the art can make various modifications or equivalent replacements to this disclosure within the spirit and protection scope of this disclosure, and such modifications or equivalent replacements should also be regarded as falling within the protection scope of this disclosure.

What is claimed is:

1. A computer-implemented method for analyzing clinical data, comprising:
    extracting, by a processor, a first feature information by applying a neural network to a medical image containing a vessel in the clinical data;
    predicting, by the processor, a disease status related parameter by applying a regression model to the extracted first feature information;
    generating, by the processor, a second feature information based on the extracted first feature information and the disease status related parameter; and
    predicting, by the processor, a disease status classification result by applying a classification model to the second feature information;
    wherein the disease status related parameter includes an estimation score of a Fractional Flow Reserve (FFR) of the vessel or a plaque vulnerability risk score of the vessel, and the disease status classification result includes a stenosis level or a plaque vulnerability level of the vessel.

2. The computer-implemented method of claim 1, wherein, the stenosis level of the vessel includes a first level indicative of no stenosis, a second level indicative of a non-significant stenosis, and a third level indicative of a significant stenosis; or the plaque vulnerability level of the vessel includes a first level indicative of non-vulnerable, a second level indicative of vulnerability at a low risk, and a third level indicative of vulnerability at a high risk.

3. The computer-implemented method of claim 1, wherein:

the regression model and the classification model are trained jointly by using a joint loss function, which includes a regression loss term and a penalty term, wherein the penalty term is designed to penalize the regression model for predicting a value belonging to a different disease status classification result from that of a regression ground truth.

4. The computer-implemented method of claim 3, wherein:

in case that the value predicted by the regression model and the regression ground truth are distributed at the same side of a preset threshold for disease status classification, the penalty term is set to zero, and wherein in case that the value predicted by the regression model and the regression ground truth are distributed at different sides of the preset threshold, the penalty term is designed to increase as the deviation between the regression predicted value and the regression ground truth increases.

5. The computer-implemented method of claim 4, wherein the penalty term is a threshold regularization loss and is represented by:

$$\begin{cases} \frac{P-t}{GT_R - t} > 0, L = 0 \\ \frac{P-t}{GT_R - t} \leq 0, L = \exp(X), X = (P - GT_R)^2 \end{cases}$$

wherein, P represents the regression predicted value, t represents the preset threshold, GTR represents the regression ground truth, and L represents the penalty term.

6. The computer-implemented method of claim 1, wherein generating a second feature information based on the extracted first feature information and the disease status related parameter further comprises:

extending the extracted first feature information into a one-dimensional vector and concatenating the one-dimensional vector with the disease status related parameter, to obtain the second feature information.

7. A computer-implemented method for analyzing clinical data, comprising:

extracting, by a processor, a first feature information by applying a neural network to a medical image containing a vessel the clinical data;

predicting, by the processor, a disease status classification result by applying a classification model to the extracted first feature information;

transforming, by the processor, the predicted disease status classification result into a one-hot representation and fusing the one-hot representation with the first feature information, to generate a second feature information; and predicting, by the processor, a disease status related parameter by applying a regression model to the second feature information;

wherein the disease status related parameter includes an estimation score of an FFR of the vessel or a plaque vulnerability risk score of the vessel, and the disease status classification result includes a stenosis level or a plaque vulnerability level of the vessel.

8. The computer-implemented method of claim 7, wherein, the stenosis level of the vessel includes a first level indicative of no stenosis, a second level indicative of a non-significant stenosis, and a third level indicative of a significant stenosis; or the plaque vulnerability level of the vessel includes a first level indicative of non-vulnerable, a second level indicative of vulnerability at a low risk, and a third level indicative of vulnerability at a high risk.

9. The computer-implemented method of claim 7, wherein, the regression model and the classification model are trained jointly by using a joint loss function, which includes a regression loss term weighted by a penalty weight, wherein the penalty weight is designed to penalize the regression model for predicting a value belonging to a different disease status classification result from that of a regression ground truth.

10. The computer-implemented method of claim 9, wherein the penalty weight in case that the regression predicted value and the regression ground truth are distributed at the same side of a preset threshold for disease status classification is smaller than the penalty weight in case that the regression predicted value and the regression ground truth are distributed at different sides of the preset threshold; or the penalty weight increases as the deviation between the regression predicted value and the regression ground truth increases.

11. The computer-implemented method of claim 9, wherein the joint loss function is:

$$JL = [1 + \exp(X)](P - GT_R)^2, X = -\frac{P-t}{GT_R - t}$$

wherein, P represents the regression predicted value, t represents the preset threshold, GTR represents the regression ground truth, and JL represents the loss function.

12. The computer-implemented method of claim 7, wherein fusing the one-hot representation with the first feature information, to generate a second feature information further comprises:

extending the one-hot representation into a one-dimensional vector, extending the first feature information into a one-dimensional vector, and concatenating the extended two one-dimensional vectors to obtain the second feature information.

13. A system for analyzing clinical data, comprising:
an interface configured to receive the clinical data; and
a processor configured to:
extract a first feature information by applying a neural network to a medical image containing a vessel the clinical data;
predict a disease status related parameter by applying a regression model to the extracted first feature information;

generate a second feature information based on the extracted first feature information and the disease status related parameter; and predict a disease status classification result by applying a classification model to the second feature information;

wherein the disease status related parameter includes an estimation score of a Fractional Flow Reserve (FFR) of the vessel or a plaque vulnerability risk score of the vessel, and the disease status classification result includes a stenosis level or a plaque vulnerability level of the vessel.

14. The system of claim 13, wherein, the stenosis level of the vessel includes a first level indicative of no stenosis, a second level indicative of a non-significant stenosis, and a third level indicative of a significant stenosis; or the plaque vulnerability level of the vessel includes a first level indicative of non-vulnerable, a second level indicative of vulnerability at a low risk, and a third level indicative of vulnerability at a high risk.

15. The system of claim 13, wherein the regression model and the classification model are trained jointly by using a joint loss function, which includes a regression loss term and a penalty term, wherein the penalty term is designed to penalize the regression model for predicting a value belonging to a different disease status classification result from that of a regression ground truth.

16. The system of claim 15, wherein in case that the value predicted by the regression model and the regression ground truth are distributed at the same side of a preset threshold for disease status classification, the penalty term is set to zero, and wherein in case that the value predicted by the regression model and the regression ground truth are distributed at different sides of the preset threshold, the penalty term is designed to increase as the deviation between the regression predicted value and the regression ground truth increases.

17. The system of claim 13, wherein to generate a second feature information based on the extracted first feature information and the disease status related parameter, the processor is further configured to:

extend the extracted first feature information into a one-dimensional vector and concatenate the one-dimensional vector with the disease status related parameter, to obtain the second feature information.

* * * * *